Oct. 14, 1924.                         1,511,723
E. R. DRAVER
MEANS FOR CONNECTING TUBULAR MEMBERS
Filed April 23, 1923
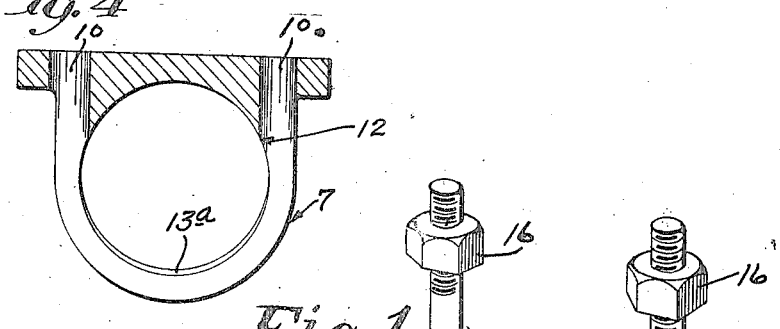
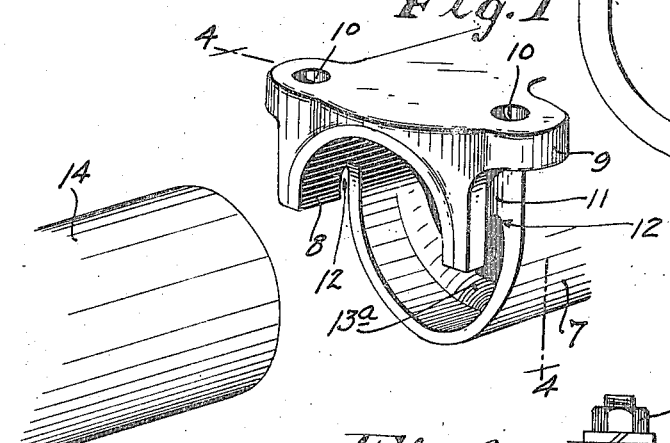
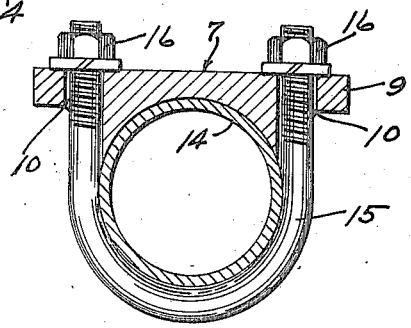
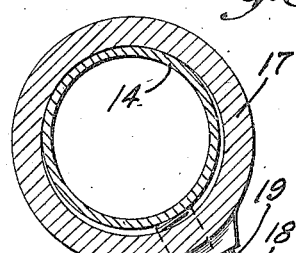
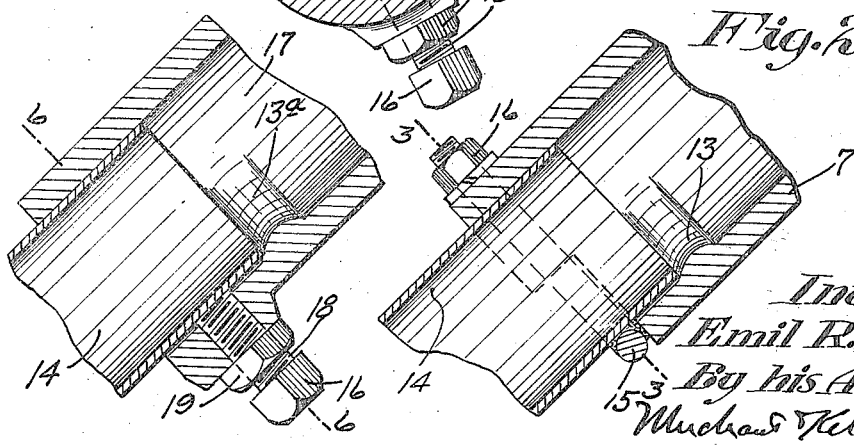
Inventor
Emil R. Draver
By his Attorney
Michael Kilgore Patented Oct. 14, 1924.

1,511,723

UNITED STATES PATENT OFFICE.

EMIL R. DRAVER, OF RICHMOND, INDIANA.

MEANS FOR CONNECTING TUBULAR MEMBERS.

Application filed April 23, 1923. Serial No. 633,879.

*To all whom it may concern:*

Be it known that I, EMIL R. DRAVER, a citizen of the United States, residing at Richmond, in the county of Wayne and State of Indiana, have invented certain new and useful Improvements in Means for Connecting Tubular Members; and I do hereby declare the following to be a full, clear, and exact description of the invention, such as will enable others skilled in the art to which it appertains to make and use the same.

Broadly, my present invention relates to means for connecting telescoped tubular members, such as the tubular ends of exhaust manifolds and exhaust pipes or exhaust pipes and the sleeves of exhaust cut-outs, for example; but for convenience in description, in connection with the accompanying drawings, the invention will be treated as applied to the tubular discharge end of an exhaust manifold for connecting the exhaust pipe thereto.

Generally stated, the invention consists of the novel devices and combinations of devices hereinafter described and defined in the claims.

In the accompanying drawings, which illustrate the invention applied as just above indicated, like characters indicate like parts throughout the several views.

Referring to the drawings:

Fig. 1 is a perspective showing the tubular discharge end of an exhaust manifold, a portion of an exhaust pipe, and a nut-equipped U-bolt, said parts being separated but arranged for co-operating coupling actions;

Fig. 2 is a fragmentary vertical section taken axially through the elements shown in Fig. 1, the said parts being assembled to couple the exhaust pipe within the tubular end of the manifold;

Fig. 3 is a transverse section on the line 3—3 of Fig. 2;

Fig. 4 is a transverse section on the line 4—4 of Fig. 1;

Fig. 5 is a view corresponding to Fig. 2 but illustrating a modified form of clamping means; and Fig. 6 is a transverse section taken on the line 6—6 of Fig. 5.

The preferred construction illustrated in Figs. 1 to 4, inclusive, will first be described.

The numeral 7 indicates the tubular discharge end of an exhaust manifold which is formed at its end with a segmental lug portion 8, the concave inner surface of which is cylindrical and preferably coincident with the inner bore or surface of the tubular portion 7. The outer surface of the lug portion 8 is preferably made flat and provided with projecting ears 9 with bolt passages 10. The cylindrical surface of the lug portion 8 is advisably extended through approximately 180°, but in line with the bolt passages 10, the sides or end extremities of the cylindrical portion of the lug 8 are formed with grooves 11 that cut slightly through the walls of the lug and form notches 12 immediately adjacent to the outer end of the tubular portion 7. The tubular portion 7, which, as is obvious, constitutes the outer of the two telescopically connectible members, is formed on its interior with a beveled segmental shoulder 13 preferably formed by an internal flange or rib. This segmental shoulder is located a considerable distance inward from the end of the tubular portion 7, and to obtain the best results, it should be eccentric or crescent-shaped so that it runs out at or blends with the sides of the tubular portion approximately on longitudinal lines that intersect intermediate portions of the notches 12; but this is a preferred and not absolutely essential precise arrangement whereby, nevertheless, additionally good results are obtained, as will presently appear. Also in this preferred arrangement, the segmental lug portion 8 extends through approximately 180° and the segmental shoulder 13 extends through approximately the other 180°, or slightly more, of a complete circle represented by the cross-section of the tubular portion 7.

The exhaust pipe 14 is of a size to quite loosely telescope into the tubular portion 7, but is of such diameter that it will be stopped against the segmental shoulder 13 when forced inward and, by said shoulder, because of the bevel of the latter, will be pressed laterally against the concave surface of the lug 8 and against the aligned inner surface of the tube 7, thereby limiting the inward movement of the pipe and forming a tight joint between the pipe and the tube or outer tubular member 7.

For clamping the pipe and tube in the telescoped relation just noted, I employ clamping means that may take various forms but which is preferably a U-bolt 15 equipped with nuts 16. This U-bolt is adapted to be passed through the grooves 11 and bolt passages 10, embracing the pipe 14, as best shown in Fig. 3; and then, when the nuts 16 are tightened, the tube and pipe will be securely clamped together with a tight joint between the two. Here it is important to note that, with the arrangement described, tightening of the nuts 16 to draw the U-bolt 15 against the pipe 14, which has already been tightly pressed against the beveled segmental shoulder 13, does not cause the pipe to move axially outward away from the said shoulder 13, as would be the case if said beveled shoulder were made as a complete or endless shoulder, or as would be the case if the said shoulder were located circumferentially adjacent to the interior or concave cylindrical surface of the lug 8. Also, it may be here noted that with the preferred arrangement described, the U-bolt can clamp the pipe circumferentially to points beyond the extremities of the cylindrical interior pipe-clamping surface of the lug 8, and this prevents lateral bulging of the pipe 14 and of very extended frictional clamping engagement between said clamping elements and the pipe. Thus, it will be seen that a very tight joint can be readily formed between the pipe and the surrounding tubular member, even when the exterior of the pipe is of considerably less diameter than the interior of the tubular outer member. Also, the pipe is very firmly clamped at all points between its extreme inner end and the extreme outer end of the lug 8.

In the modified construction illustrated in Figs. 5 and 6, the outer tubular member 17, which may be also assumed to be the discharge end of an exhaust manifold, is shown as terminated in a single plane perpendicular to its axis, but it is provided a considerable distance from its end with a beveled segmental shoulder 13ª that preferably corresponds to the shoulder 13. In this arrangement, however, the U-bolt is not employed as a clamping means, but in lieu thereof, a set screw 18 is applied through the tube 17 in longitudinal line with the central portion of the shoulder 13ª. In this arrangement, the pipe 14, which, as before, is pressed against the shoulder 13ª as far as it will go, is then rigidly secured within the tube by tightening of the set screw 18 against the same. The set screw 18 is shown as provided with a lock nut 19.

From what has been said, it will be understood that the structure illustrated in the drawings is capable of considerable modification within the scope of my invention as herein disclosed and claimed.

What I claim is:

1. The combination with telescoped tubular members, of means applied thereto for pressing approximately one-half of the external surface of said inner tubular member against approximately one-half of the internal surface of said external tubular member, and said external tubular member having a beveled internal stop surface engageable with the inner end of the inner tubular member and forming a close joint between those halves of the two members that are opposite to said halves that are directly clamped together.

2. The combination with telescoped tubular members, of a nut-equipped U-bolt anchored to said outer tubular member and embracing the inner tubular member and clamping approximately one-half of the external surface of said inner tubular member into contact with substantially one-half of the inner surface of said outer tubular member, said outer tubular member having a beveled internal segmental stop surface engageable with the inner end of said inner tubular member along that half thereof that is opposite to said closely engaged halves of said two members.

3. The combination with telescoped tubular members, of means applied thereto for pressing approximately one-half of the external surface of said inner tubular member against approximately one-half of the internal surface of said external tubular member, said external tubular member having an eccentric or crescent-shaped internal stop surface that is engageable with the inner end of said inner tubular member along that half thereof that is opposite to said closely engaged halves of said two members.

4. The combination with telescoped tubular members, of a nut-equipped U-bolt anchored to said outer tubular member and embracing the inner tubular member and clamping approximately one-half of the external surface of said inner tubular member into contact with substantially one-half of the inner surface of said outer tubular member, said outer tubular member having an eccentric or crescent-shaped internal stop surface that is engageable with the inner end of said inner tubular member along that half thereof that is opposite to said closely engaged halves of said two members.

5. The combination with telescoped tubular members, the outer of which has a lug-forming portion that projects axially and extends through approximately one-half the circumference thereof, and a U-bolt applied to said projecting lug-forming portion and embracing said inner tubular member and clamping the same against the internal surface of said lug-forming portion and against approximately one-half of the internal surface of said external tubular member, said external tubular member on the side opposite to the internal surface of said lug-forming portion having a beveled internal segmental stop surface that is engageable with the inner end of said inner tubular member along that half thereof that is opposite to said closely engaged halves of said two members.

6. A tubular member provided at one end with a lug-forming portion that is offset axially and extends through approximately one-half the circumference thereof, said tubular member having on that side that is opposite to said lug-forming portion a beveled internal segmental stop surface adapted to engage an internal tubular member, and means in said lug-forming portion for supporting a U-bolt adapted to engage an internal tubular member.

In testimony whereof I affix my signature.

EMIL R. DRAVER.